Patented Mar. 10, 1936

2,033,233

UNITED STATES PATENT OFFICE 2,033,233

METHOD OF MAKING HYDRAULIC CEMENT COMPOSITIONS

Maurice Ernotte, Brussels, Belgium

No Drawing. Application January 6, 1933, Serial No. 650,497. In Belgium January 13, 1932

2 Claims. (Cl. 106—24)

As it is known, one of the operations in the manufacture of sugar consists in purifying the saccharine juices by "carbonating", lime being added to said juices and the mixture being submitted to the action of carbon dioxide, in such conditions that a precipitate is formed carrying down impurities, said precipitate forming the carbonate waste of sugar factories. As they are mixed with organic substances spreading bad smells, said waste is scattered on the fields as a manure.

The present invention is based upon the discovery that the carbonate waste of sugar factories has particular physical and physico-chemical properties. It constitutes a perfect filling material having both an impalpability and an unctuousness which are not found in any other known product capable of being economically used as a filler. The impalpability of the powder obtained in drying said waste is due to the fact that the insoluble calcium salts forming the main portion thereof have a tenuity such that the dimensions of their grains are of the order of a micron. Forming a binder between these impalpable grains, organic substances, mainly albuminoid substances in a colloidal condition, communicate to the product its unctuous character.

By way of example of a composition of carbonate waste of sugar factories may be cited the following analysis of a sample which originally contained about 40% of water, eliminated by drying at 100° C.

| | Per cent |
|---|---|
| Insoluble calcium salts | 84 |
| Organic substances | 6 |
| Iron oxide, silica, alumina, magnesia | 10 |
| | 100 |

The invention consists in the method of making hydraulic cement compositions, comprising the step of admixing with hydraulic cement the by-products from the carbonation of saccharine juices.

Economically, the invention affords a considerable progress by the fact that it utilizes, at very low cost, a waste material the storing of which caused large grounds to remain unproductive.

The invention forms also a considerable progress not only in giving value to a discarded by-product of the sugar industry, but also for reason of the interesting results obtained by the use of the said filling material in the cement and concrete industry. When mixed to the latter materials, the impalpable grains of the waste penetrate into the spaces left between the grains of cement when mixed with water, and the addition of the new filler increases in a considerable degree the resistance of the mortar or concrete; furthermore, the colloidal organic substances which coat the grains complete the compactness of the whole by binding the different ingredients of the mixture.

Practically, resistance and impermeability are increased, and as more uniform mixtures are obtained, the concretes can be prepared in very wet condition without fear of its different ingredients (gravel, sand, cement, water and the like) separating.

By way of example to show the increase of resistance of cements by the addition of a predetermined proportion of said carbonate waste, it may be stated that, a proof mixture containing three parts by weight of sand and one part by weight of cement, to which carbonate waste has been added in the proportion of 10% by weight of the cement, shows an increase of resistance to tensile stress of 5% and of resistance to pressure of 60%.

In a general way, the filling material according to the invention will find its application anywhere it will be convenient to incorporate calcium carbonate in a state of high tenuity and/or colloidal substances with hydraulic cement compositions of any kind and use, and said by-products may be used in a dry, wet or pasty condition.

I claim:

1. A method of making hydraulic cement compositions comprising the step of admixing with hydraulic cement the by-products from the carbonation of saccharine juices.

2. A hydraulic cement composition comprising hydraulic cement and the by-products from the carbonation of saccharine juices as a filler.

MAURICE ERNOTTE.